March 27, 1956  J. J. DENOVAN ET AL  2,739,708
SEPARATORY APPARATUS FOR CONCENTRATING ASBESTOS FIBERS
Original Filed Jan. 2, 1951
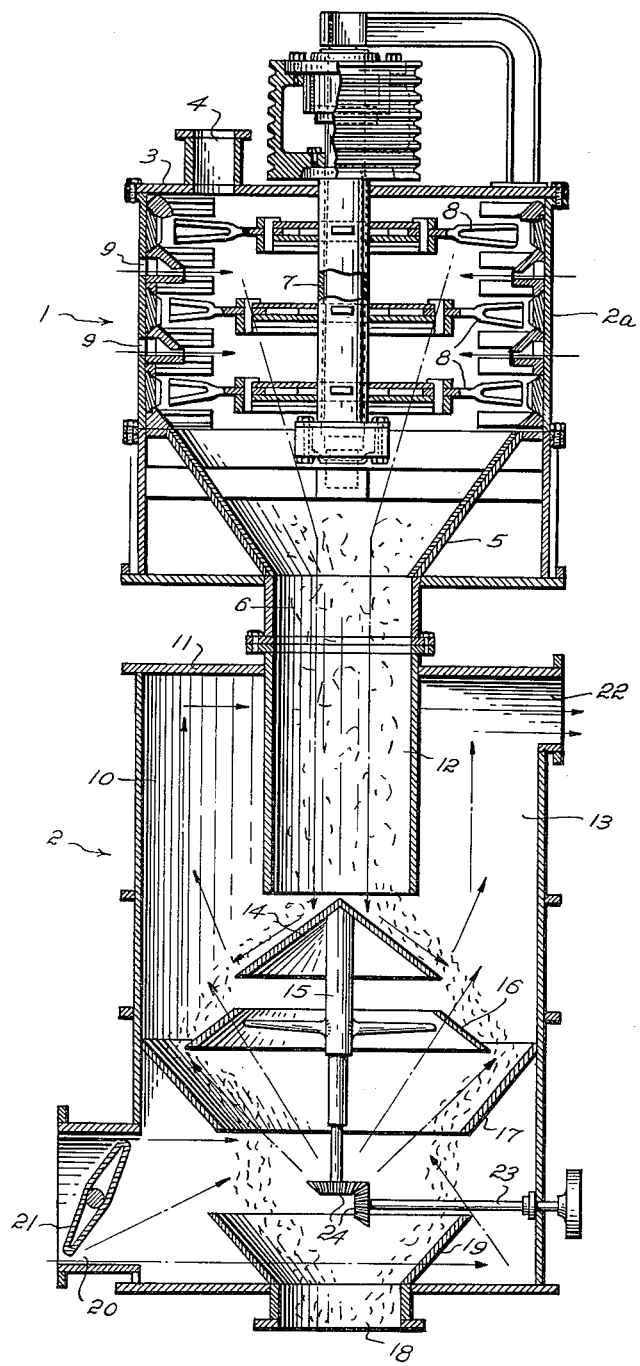
Inventors:
John J. Denovan and
Robert A. Denovan
By
Attorney.

United States Patent Office 2,739,708
Patented Mar. 27, 1956

2,739,708

SEPARATORY APPARATUS FOR CONCENTRATING ASBESTOS FIBERS

John J. Denovan, Lachine, Montreal, Quebec, and Robert A. Denovan, Sherbrooke, Quebec, Canada, assignors to Hall Machinery of Canada Limited, Sherbrooke, Quebec, Canada Original application January 2, 1951, Serial No. 204,034. Divided and this application September 4, 1953, Serial No. 378,606

1 Claim. (Cl. 209—138)

This invention relates to apparatus for producing asbestos fibers, and is a division of copending application, Serial No. 204,034, filed January 2, 1951, now Patent 2,695,755, dated November 30, 1954.

It is an object of this invention to provide means for treating asbestos ore to obtain therefrom an optimum percentage of long, undamaged fibers completely freed from unfiberized pieces of ore, unwanted gangue material, and foreign objects.

The invention comprises means for providing a gravitational flow of asbestos ore, initially subjecting the flow to fiberizing impacts, to produce a gravitational flow of substantially fiberized material, then directing such flow onto a plurality of vertically separated downwardly inclined surfaces to produce between each adjacent pair of said surfaces a freely falling zone of material and directing a strong current of air upwardly through said zones to entrain the fibers therein and permit unwanted material to continue its descent.

The invention will be described with reference to the accompanying drawing, in which the single figure is a sectional elevation of a machine in accordance with the invention.

In the drawing, 1 is a fiberizing machine and 2 a fiber concentrating device arranged in vertically aligned, spaced relation.

The fiberizing machine is fully described in the above mentioned copending application and comprises a cylindrical casing 2 having a top closure plate 3, an axially offset ore inlet 4 in the closure plate, and a conical bottom portion 5 leading to an axial discharge outlet 6. The casing contains a central driven shaft 7 carrying a plurality of vertically spaced series of impact hammers 8. Between each series of hammers the casing is provided with a plurality of air inlets 9 for direction of a generally horizontally disposed air current.

The concentrator 2 comprises a cylindrical casing 10 having a closed top wall 11 through which axially extends a cylindrical vertically disposed chute 12 connected to outlet 6 of the fiberizer. The chute 12 extends a substantial distance into casing 10 to form a surrounding annular chamber 13 which, as shown, occupies approximately one-third of the height of the casing.

Within the casing 10 and axially arranged directly below and in spaced relation to the lower end of chute 12 to receive the discharge therefrom is a conical baffle 14 carried by a shaft 15. The outer diameter of baffle 14 is somewhat larger than that of chute 12. Also carried by shaft 15 below and in vertically spaced relation to baffle 14 is an annular baffle 16 of frustro-conical shape, the diameter of the upper end of which is slightly less than that of the lower end of baffle 14.

Located below and spaced from baffle 16 is an additional baffle 17 of inverted frustro-conical shape, the upper periphery of which is fixed to casing 10, as shown. The upper periphery of baffle 17 is of substantially greater diameter than that of the lower periphery of baffle 16, whereby material discharged from the surface of baffle 16 may be deposited upon the inner surface of baffle 17.

It will be observed that baffles 14 and 16 provide downwardly inclined material receiving surfaces arranged to direct the material in a radially outward direction, while baffle 17 provides a downwardly inclined material receiving surface arranged to direct the material in a radially inward direction.

A waste discharge chute 18 is axially located in the bottom wall of the casing 10. The mouth of chute 18 is flared outwardly to provide an inclined baffle 19 arranged to receive the discharge from the lower end of baffle 17. Moreover, the baffle 19 is spaced below the lower end of baffle 17 to provide a free space therebetween.

Below baffle 17 and generally opposite the baffle 19 and the free space thereabove is an air inlet 20 in the side wall of the casing. The inlet may be provided with a valve 21. An air and fiber outlet 22 is provided in the side wall of casing 10 adjacent the top wall and, as shown, diagonally opposite inlet 20, but may be at any angle relative to inlet 20.

Means for adjusting the vertical elevation of baffles 14 and 16 may be provided and, as shown, comprises a transversely extending shaft 23 connected to the lower end of shaft 15 through gears 24.

In operation, ore is fed through inlet 4 for gravitational flow through casing 2 where it is subjected to a series of impacts by hammers 8 in a plurality of vertically spaced zones. After each series of impacts the falling material is subjected to a horizontally directed air current from inlets 9 to sweep loosened fibers from the ore bundles.

The free fibers, together with any unfiberized ore and unwanted gangue material and foreign objects in the ore are directed still in gravitational flow by conical portion 5 into the chute 12 of concentrator 2. A relatively strong current of air under pressure is admitted to the casing 10 through inlet 21. As the material emerges from chute 12 it falls upon the inclined surface of baffle 14, and thence onto baffles 16, 17 and 19 and finally into chute 18. Since all of these baffles are in vertically spaced relation to each other, there is provided a freely falling zone of material between each pair of adjacent baffles. Moreover, the upwardly flowing air current is directed by the baffles in directly countercurrent flow to the falling material in each zone. There is thus provided a plurality of vertically spaced zones of treatment in each of which freely falling material is subjected to a strong air current to remove fibers therefrom, each such zone being separated from the adjacent zone by inclined baffle means for directing the material into the next zone of treatment.

The current of air with entrained fibers finally flows through annular chamber 13 from whence it emerges through outlet 22, where it is conducted to a fiber collector of usual type. The air flow is indicated by arrows in the drawing. It will be appreciated that the air current may be arranged in a substantially closed circuit.

Pieces of ore from which fibers have not been completely released and gangue material, as well as any tramp objects in the ore, are discharged through chute 18.

The sweeping of the fibers from the treated material in a plurality of vertically spaced zones in each of which the material is in a freely falling state is particularly effective in producing a clean and concentrated fiber product. In particular, there is provided a falling cylindrical curtain of material in each zone and a current of air is directed through such curtain to provide a concentrated sweeping action in each zone which is much more effective than uncontrolled countercurrent air sweeping.

I claim:

Asbestos fiber concentrating apparatus comprising a vertically disposed cylindrical casing, a tubular inlet member for asbestos fiber containing material axially arranged in the top wall of the casing and extending a substantial distance into the casing, a conical baffle of larger overall diameter than that of said inlet member axially disposed in said casing below said tubular member and in spaced relation thereto to receive material falling from said tubular member and to discharge said material in a falling cylindrical curtain, a frustro-conical baffle axially disposed in said casing below said conical baffle in spaced relation thereto said frustro-conical baffle having an upper diameter not substantially greater than and a lower diameter greater than said diameter of the conical baffle to receive said cylindrical curtain of material therefrom and to discharge the received material in a second falling cylindrical curtain, and an inverted frustro-conical baffle axially disposed in said casing below said frustro-conical baffle in spaced relation thereto, said inverted frustro-conical baffle being spaced from the bottom wall of the casing and having an upper diameter substantially equal to that of the casing and thus greater than the lower diameter of said frustro-conical baffle and a lower diameter less than the lower diameter of said frustro-conical baffle to receive said second curtain of material and to discharge the received material in a third falling cylindrical curtain, said casing having an axial outlet in the bottom wall thereof in spaced relation to said inverted frustro-conical baffle to receive said third cylindrical curtain, an air inlet in the side wall thereof below said inverted frustro-conical baffle and adjacent said bottom wall, and an air outlet in the side wall thereof located substantially above the lower end of said tubular member and adjacent said top wall, the interior wall surface of said casing above said inverted frustro-conical baffle being substantially vertical and unobstructed to provide a generally annular chamber in said casing surrounding said tubular member, conical baffle, and frustro-conical baffle for unobstructed passage of fiber-laden air to said air outlet.

References Cited in the file of this patent

UNITED STATES PATENTS

| | | |
|---|---|---|
| 263,472 | Brown | Aug. 29, 1882 |
| 492,720 | Frey | Feb. 28, 1893 |
| 553,091 | Woodward | Jan. 14, 1896 |
| 1,484,208 | Davis | Feb. 19, 1924 |
| 2,446,786 | Redhead | Aug. 10, 1948 |
| 2,629,491 | Sutherland | Feb. 24, 1953 |

FOREIGN PATENTS

| | | |
|---|---|---|
| 279,206 | Italy | Nov. 5, 1930 |